United States Patent [19]

Czastkiewicz

[11] Patent Number: 5,482,527
[45] Date of Patent: Jan. 9, 1996

[54] SPINNER APPARATUS FOR PRODUCING DUAL COMPONENT FIBERS

[75] Inventor: Witold S. Czastkiewicz, Orleans, Canada

[73] Assignee: Owens-Corning Fiberglas Technology, Inc., Summit, Ill.

[21] Appl. No.: 309,236

[22] Filed: Sep. 20, 1994

[51] Int. Cl.⁶ .......................... C03B 37/023; C03B 37/08
[52] U.S. Cl. .............................. 65/502; 65/504; 65/521; 264/211.1; 264/DIG. 26; 264/DIG. 29; 264/168; 425/DIG. 217
[58] Field of Search ............................. 65/502, 504, 516, 65/521, 438, 459, 470; 264/211.1, DIG. 26, DIG. 29, 168, 174, 8; 425/DIG. 217, 8

[56] References Cited

U.S. PATENT DOCUMENTS

| Re. 24,708 | 9/1959 | Heymes et al. . | |
|---|---|---|---|
| 2,998,620 | 9/1961 | Stalego . | |
| 3,375,548 | 4/1968 | Kido | 264/DIG. 26 |
| 4,203,745 | 5/1980 | Battigelli et al. . | |

Primary Examiner—David A. Simmons
Assistant Examiner—John Hoffmann
Attorney, Agent, or Firm—C. Michael Gegenheimer; Robert L. Showalter

[57] ABSTRACT

An apparatus is provided for making dual component fibers. The apparatus comprises a distributor, equipment for providing first and second thermoplastic materials to the distributor, a rotatable spinner and a rotation mechanism. The distributor has an outer casing and a divider cup fixedly positioned within the outer casing. The outer casing has first and second orifices extending through its peripheral wall. The divider cup defines with the outer casing first and second chambers for receiving first and second molten thermoplastic materials. The first orifices communicate with the first chamber and the second orifices communicate with the second chamber. The rotatable spinner includes first and second passages in its peripheral wall. The rotation mechanism rotates the distributor and the spinner to centrifuge layers of the first and second thermoplastic materials through the first and second orifices and to centrifuge dual component fibers through the first and second passages in the peripheral wall of the spinner.

17 Claims, 8 Drawing Sheets

SPINNER APPARATUS FOR PRODUCING DUAL COMPONENT FIBERS

SPECIFICATION

To all whom it may concern:

Be it known that I, Witold J. Czastkiewicz, a citizen of Canada, resident of Orleans, Province of Ontario, have invented a new and useful improvement in a SPINNER APPARATUS FOR PRODUCING DUAL COMPONENT FIBERS, which invention is fully set forth in the following specification.

BACKGROUND OF THE INVENTION

This invention relates to an apparatus for manufacturing dual component fibers from thermoplastic materials and, more particularly, to a spinner apparatus for centrifuging dual component fibers from two streams of molten thermoplastic materials such as glass or other mineral fibers or polymer fibers.

Fibers of glass and other thermoplastic materials are useful in a variety of applications including acoustical or thermal insulation materials. Common prior art methods for producing glass fiber insulation products involve producing glass fibers from a rotary process. A single molten glass composition is forced through the orifices in the outer wall of a centrifuge commonly known as a spinner, producing primarily short, straight glass fibers.

A modification of conventional glass fibers, which are usually straight fibers, is the use of fibers which are curly (helical) in shape. These fibers can be made by joining two distinct glass streams, commonly referred to as A glass and B glass streams, and centrifuging the dual glass streams into a curly (helical) fiber.

Stalego, U.S. Pat. No. 2,998,620, discloses curly (helical) glass fibers of bicomponent glass compositions. Stalego discloses producing staple curly fibers by passing two glass compositions having differing coefficients of thermal expansion through the orifices of a spinner. The glasses are extruded as a dual glass stream in aligned integral relationship such that the fibers curl naturally upon cooling due to the differences in their coefficients of thermal expansion. Stalego discloses in one embodiment a spinner having two vertically spaced distributing surfaces. The first distributing surface is defined by the bottom of the spinner. It receives one stream of molten glass. A distributing table surface is mounted a vertical distance from the first surface and defines the second distributing surface. The table surface is mounted such that its circumferential edge bisects each of a plurality of orifices so that glass on each level is ejected by centrifugal force through only half of each orifice. Thus, the glass on the two distributing surfaces flow together at the orifices and are emitted as bi-glass streams to be attenuated into fibers.

However, there remains a need in this art for improving the delivery of dual streams of molten glasses to form dual glass or other thermoplastic fibers.

SUMMARY OF THE INVENTION

This need is met by the present invention wherein an improved fiberizer is provided for forming dual glass or other thermoplastic fibers. The fiberizer comprises a spinner and a distributor having an outer casing and an inner divider cup. The distributor is nested within the spinner. The inner divider cup defines with the outer casing first and second glass receiving chambers.

In accordance with a first aspect of the present invention, an apparatus is provided for making dual component fibers. The apparatus comprises a distributor, equipment for providing first and second thermoplastic materials to the distributor, a rotatable spinner and a rotation mechanism. The distributor has an outer casing and a divider cup fixedly positioned within the outer casing. The outer casing has bottom and peripheral walls and includes first and second orifices extending through the peripheral wall. The divider cup defines with the outer casing first and second chambers for receiving first and second molten thermoplastic materials. The first orifices communicate with the first chamber and the second orifices communicate with the second chamber. The rotatable spinner has peripheral and bottom walls and includes first and second passages in the peripheral wall. The rotation mechanism rotates the distributor and the spinner to centrifuge layers of the first and second thermoplastic materials through the first and second orifices in the peripheral wall of the outer casing and against an inner face of the peripheral wall of the spinner and to centrifuge dual component fibers through the first and second passages in the peripheral wall of the spinner.

The rotatable spinner includes a plurality of baffles which define with the inner face of the peripheral wall of the spinner a plurality of generally horizontally aligned compartments. The first passages communicate with alternate ones of the compartments and the second passages communicate with remaining ones of the compartments. Adjacent ones of the first and second passages join together in a V-shape. In an alternative embodiment, adjacent ones of the first and second passages join together in a Y-shape.

The divider cup may define with the outer casing two substantially diametrically opposed first chambers and two substantially diametrically opposed second chambers. The divider cup comprises an inner bore, first and second generally arcuate base portions, first and second lobe portions and side wall portions. The first and second base portions define with the outer casing and the side wall portions the two first chambers and the first and second lobe portions define with the outer casing and the side wall portions the two second chambers.

The supplying equipment comprises first and second glass supply tubes. The first glass supply tube extends into the bore and the second supply tube is positioned above an upper surface of the divider cup.

The distributor may be fixedly located within the rotatable spinner to rotate with the spinner. Alternatively, the distributor may rotate independently of the spinner.

In accordance with a second aspect of the present invention, apparatus is provided for making dual component fibers. The apparatus comprises a distributor, equipment for supplying first and second molten thermoplastic materials to the distributor, a rotatable spinner and a rotation mechanism. The distributor includes an outer casing and a divider portion. The outer casing has bottom and peripheral walls and includes first and second orifices extending through the peripheral wall. The divider portion defines with the outer casing first and second chambers for receiving first and second molten thermoplastic materials. The first orifices communicate with the first chamber and the second orifices communicate with the second chamber. The rotatable spinner has peripheral and bottom walls and includes first and second passages in the peripheral wall. The rotatable spinner further includes a plurality of baffles which define with an inner face of the peripheral wall of the spinner a plurality of generally horizontally aligned compartments. The first passages communicate with alternate ones of the compartments and the second passages communicate with remaining ones of the compartments. The rotation mechanism rotates the distributor and the spinner to centrifuge layers of the first and second thermoplastic materials through the first and second orifices in the peripheral wall of the outer casing and against an inner face of the peripheral wall of the spinner and to centrifuge dual component fibers through the first and second passages in the peripheral wall of the spinner.

Accordingly, it is a feature of the present invention to provide an apparatus comprising a rotatable spinner having a distributor nested therein which forms dual component fibers. This and other features and advantages of the present invention will become apparent from the following detailed description, the accompanying drawings, and the appended claims.

DETAILED DESCRIPTION OF THE INVENTION

The invention will be described in terms of apparatus for making irregularly-shaped (i.e., non-straight along their axial length) dual glass fibers, although it is to be understood that the invention encompasses apparatus for making other types of dual glass fibers such as curly (helical) fibers and dual component fibers of other thermoplastic materials, such as polyester or polypropylene, or combinations of glass and polymer.

Figure 1:
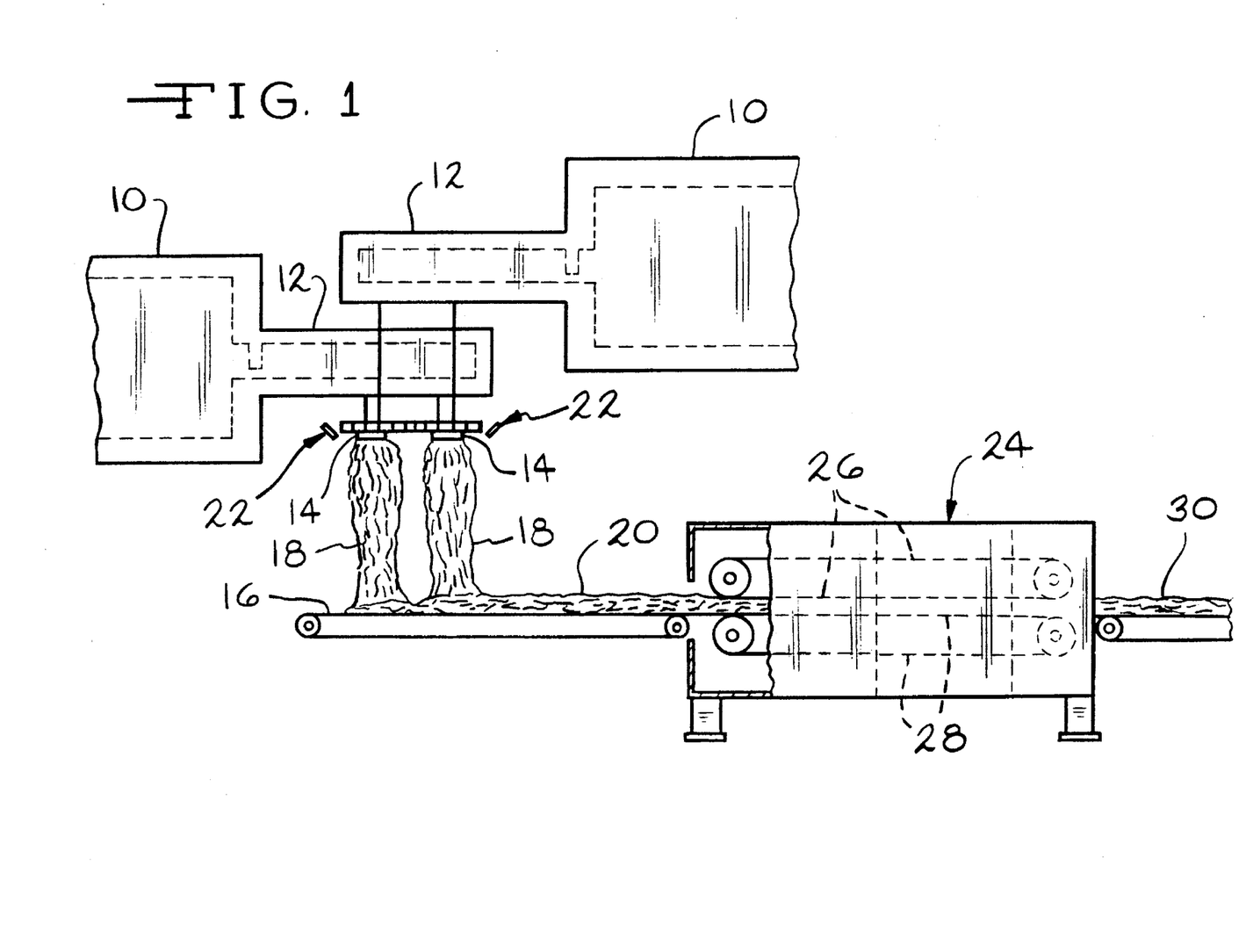
FIG. 1 is a schematic view, in elevation, of apparatus for making dual component fibers in accordance with the present invention.

The insulation products of irregularly-shaped glass fibers may be produced from a rotary fiber forming and pack heat setting process as shown in FIG. 1. Two distinct molten glass compositions (A glass and B glass) are supplied from any suitable source of glass such as furnaces 10 and forehearths 12 to rotary fiberizers 14. For this invention, the rotary fiberizers include a rotatable spinner with a distributor nested therein. Preferably, the glasses have different mechanical attributes so that upon cooling, they will assume an irregular (as opposed to straight) configuration. Such different mechanical attributes may be, for example, differing coefficients of thermal expansion, differing melting points, differing viscosities, or differing mechanical strengths. Veils 18 of dual glass fibers, such as irregularly-shaped glass fibers produced by the fiberizers, are collected on conveyor 16 as wool pack 20 by means of a vacuum positioned beneath the conveyor (not shown). As the fibers are blown downwardly by air or gases to conveyor 16 by means of blowers 22 adjacent the fiberizers, they are attenuated, cool, and attain their irregular shape.

The wool pack 20 may then optionally be passed through oven 24 at heat setting temperatures of from about 700° to 1200° F. (371° to 650° C.). The heat setting temperature may be achieved either by retarding the fiber cooling process after fiber forming to retain some of the heat from the fiber forming process, or by reheating the fibers in heat setting oven 24. While passing through the oven, wool pack 20 is shaped by top conveyor 26 and bottom conveyor 28, and by edge guides (not shown). While in oven 24, the glass fibers may be subjected to flows of hot gases to facilitate uniform heating. When the fibers are constrained by conveyors 26 and 28, the fibers are stressed in the manner of a compressed spring. When subjected to heat setting temperatures, the fibers relax, reducing stress, so that the wool pack holds its desired shape. After a period of up to 15 minutes, the wool pack then exits oven 24 as insulation product 30.

It is to be understood that heat setting is an optional aspect of the present invention. Alternatively, the wool pack may be encapsulated with an exterior plastic layer as taught by Schelhorn et al., U.S. Pat. No. 5,277,955, the disclosure of which is hereby incorporated by reference. Further, the wool pack may be subjected to other fabrication techniques including stitching, needling, or hydro-entanglement.

Figure 2:
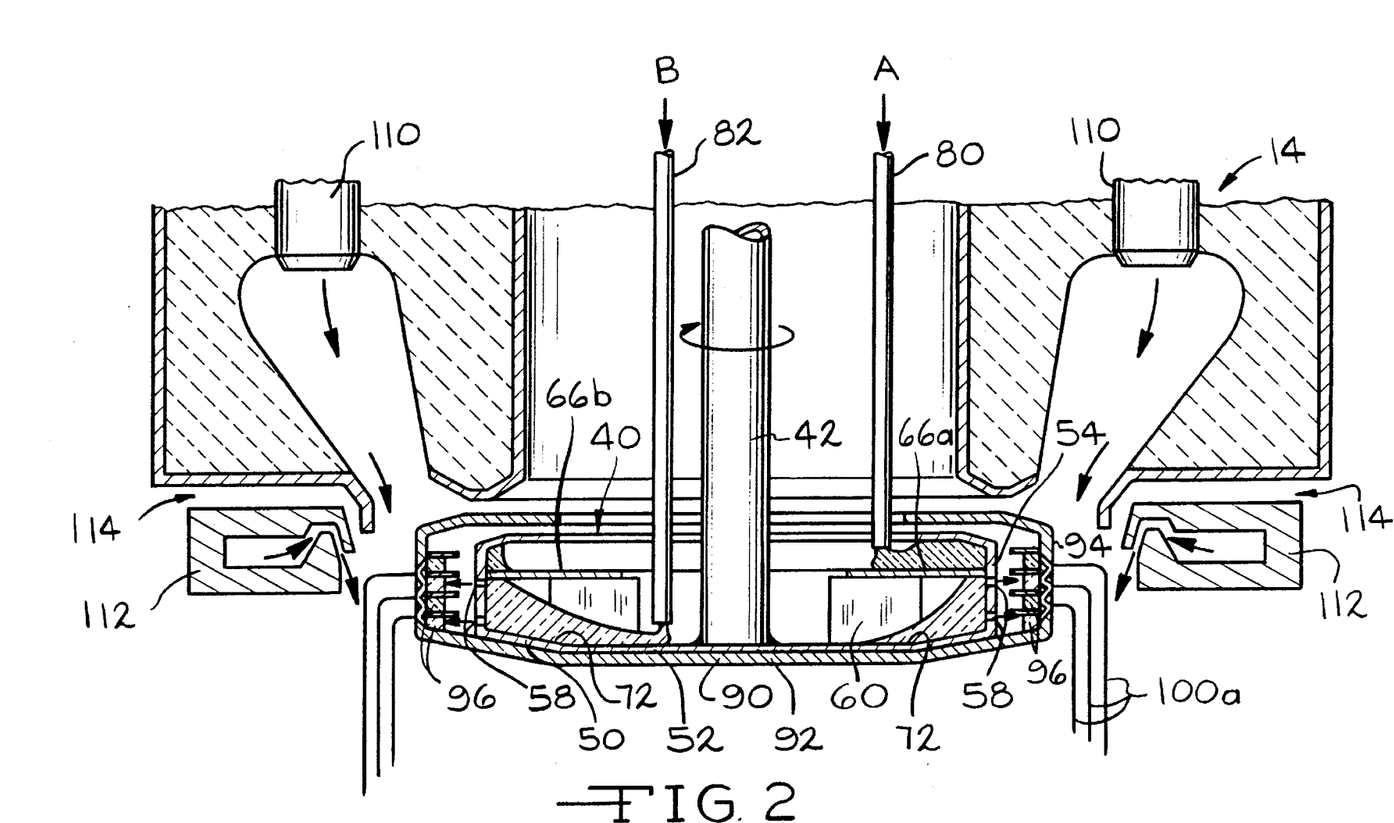
FIG. 2 is a cross-sectional view, in elevation, of the spinner, with a distributor nested therein, used in the practice of the invention.
Figure 3:
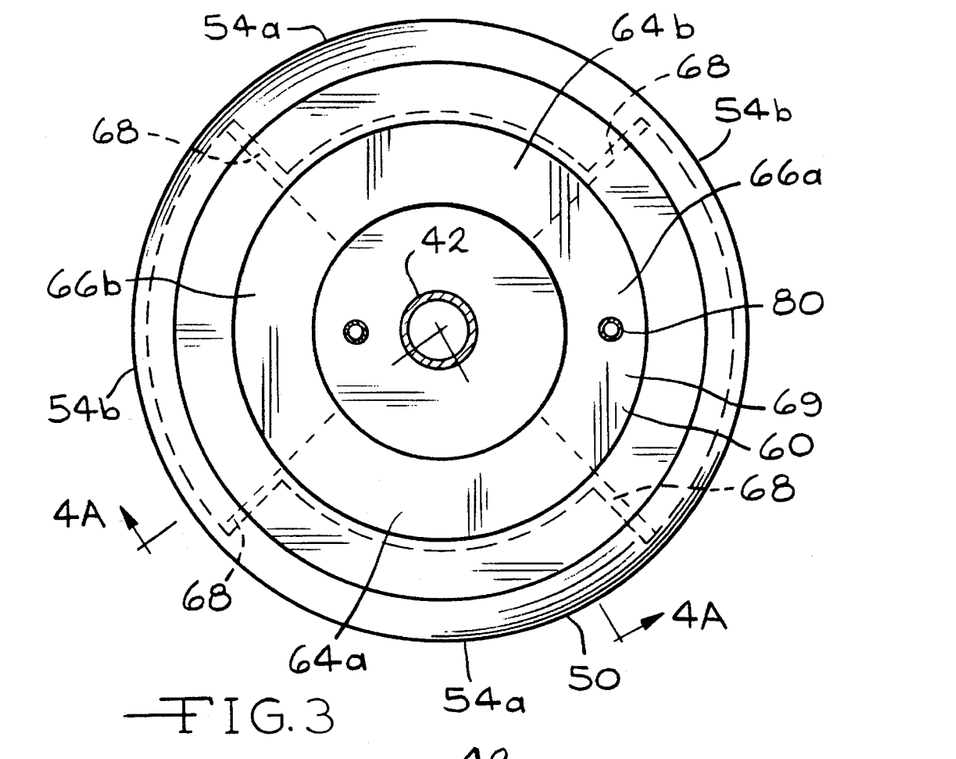
FIG. 3 is a plan view of the spinner and distributor shown in FIG. 2.
Figure 4A:
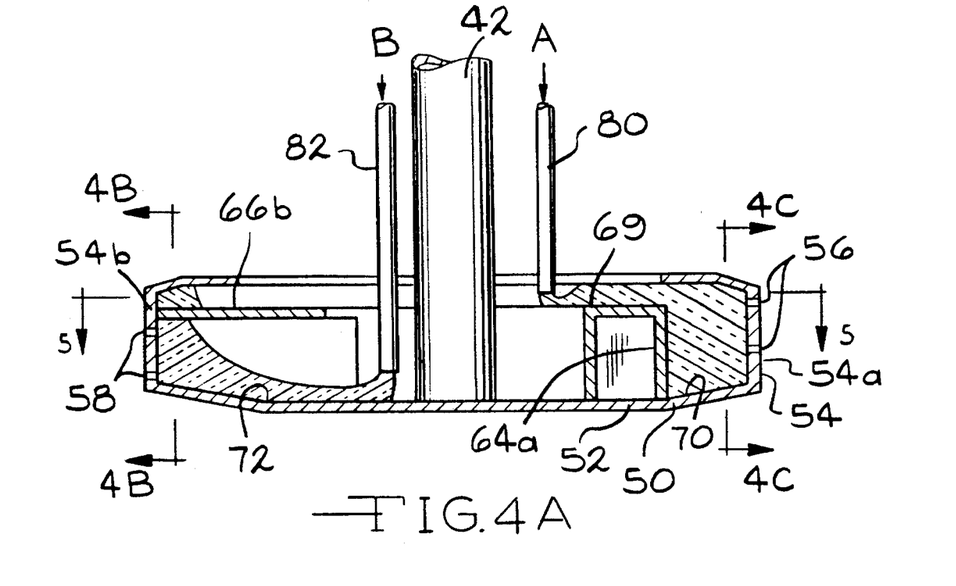
FIG. 4A is a view taken along section line 4A—4A in FIG. 3.
Figure 4B:
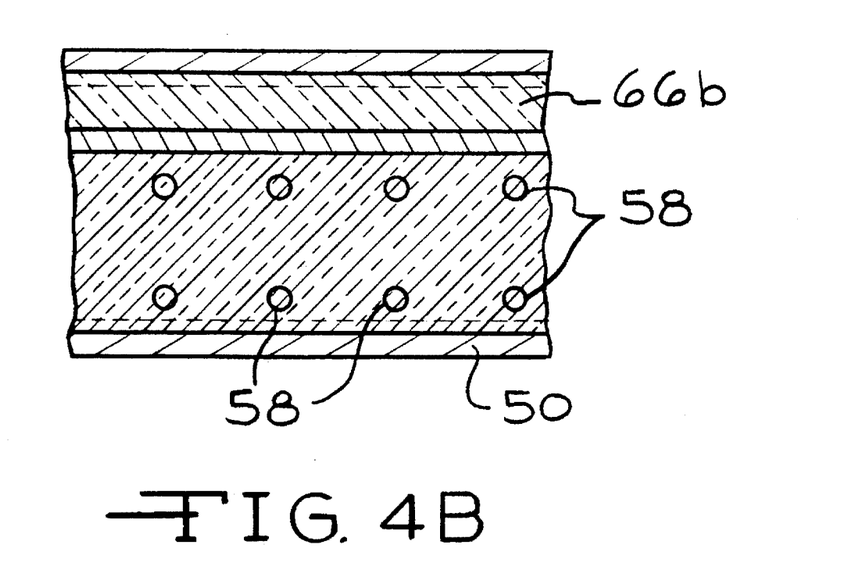
FIG. 4B is a view taken along section line 4B—4B in FIG. 4A.
Figure 4C:
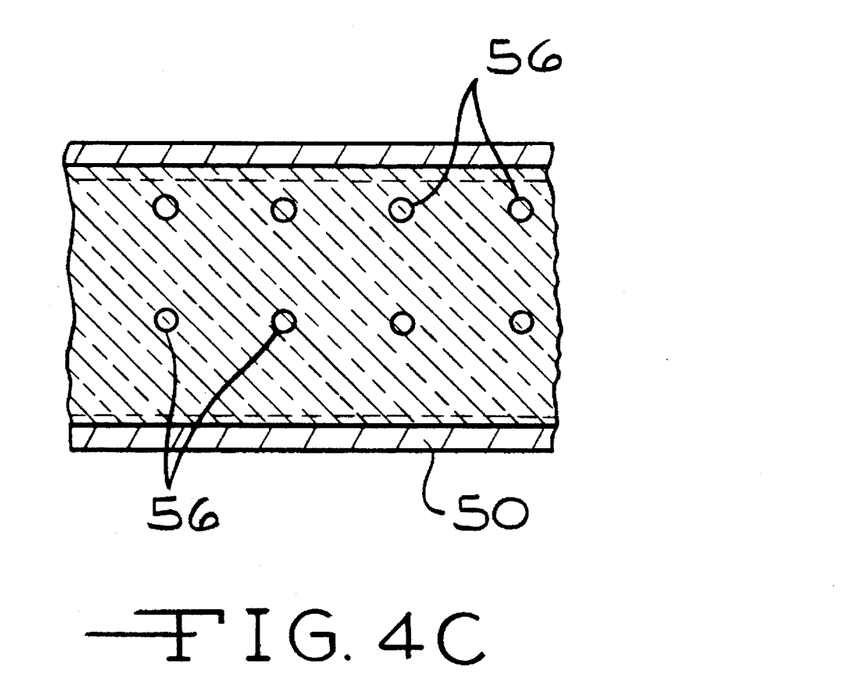
FIG. 4C is a view taken along section line 4C—4C in FIG. 4A.
Figure 5:
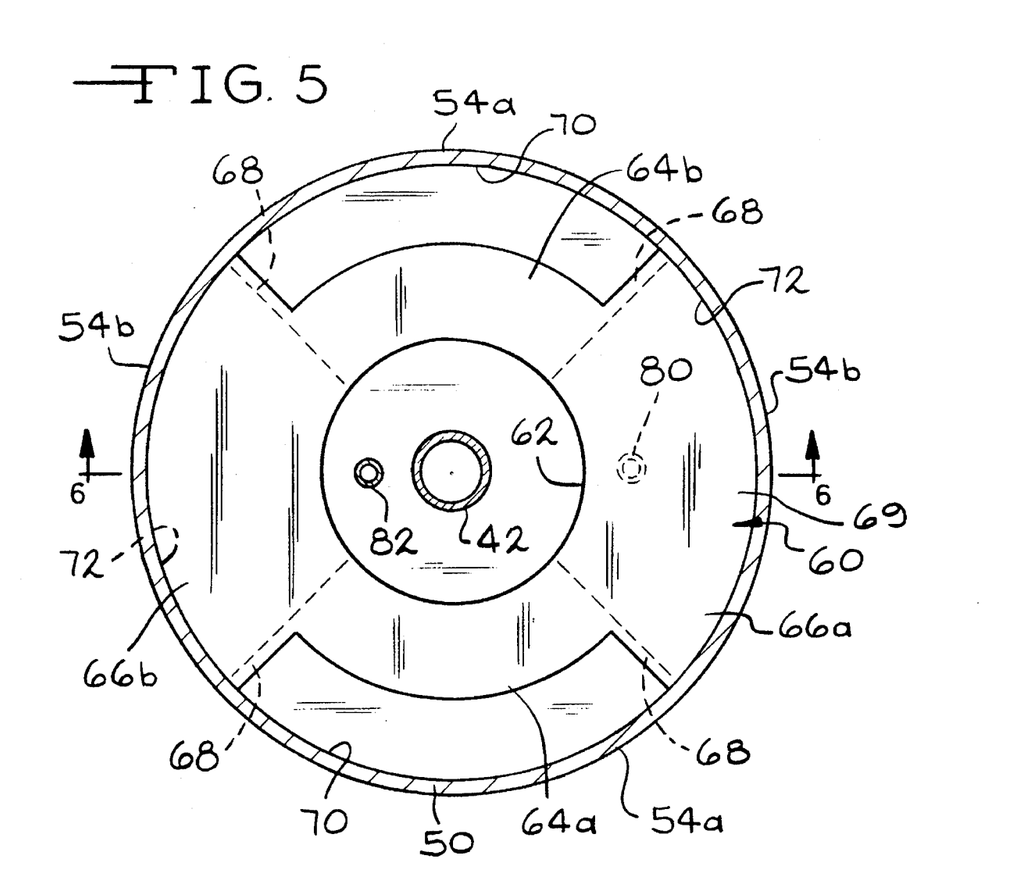
FIG. 5 is a view taken along section line 5—5 in FIG. 4A.
Figure 6:
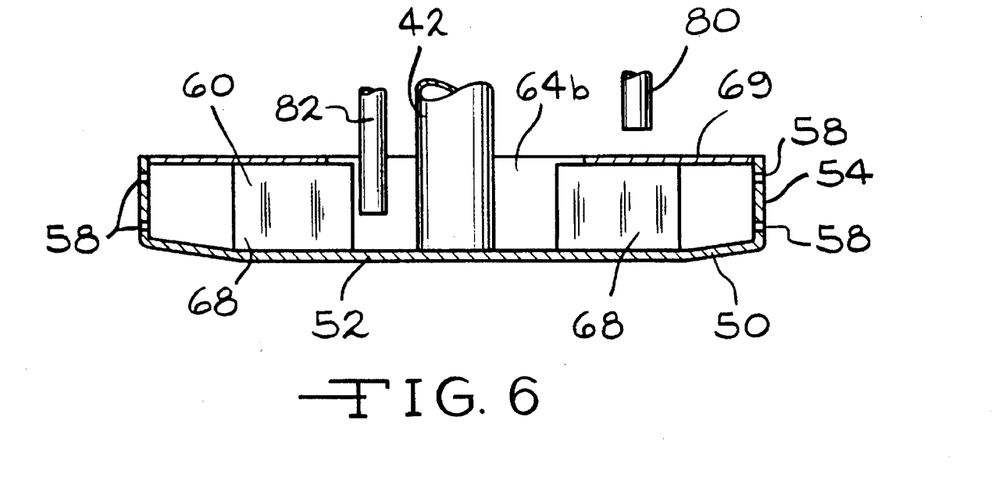
FIG. 6 is a view taken along section line 6—6 in FIG. 5.
Figure 7:
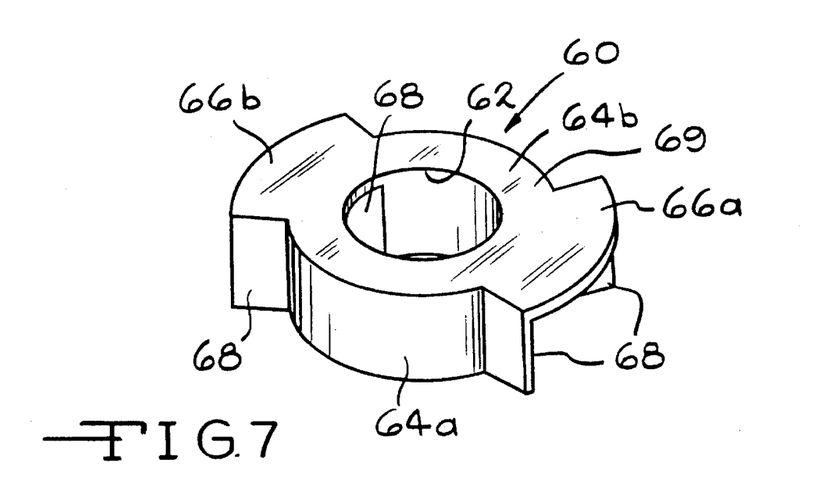
FIG. 7 is a perspective view of the divider cup of the distributor shown in FIG. 2.

As shown in FIG. 2, distributor 40 includes an outer casing 50 and a divider cup 60 fixedly positioned within the outer casing 50. The outer casing 50 has a bottom wall 52 and a peripheral wall 54. Extending through the peripheral wall 54 are first and second orifices 56 and 58, see also FIGS. 4A–4C. The first orifices 56 are positioned along first diametrically opposed circumferential portions 54a of the peripheral wall 54 while the second orifices 58 are positioned along second diametrically opposed circumferential portions 54b of the peripheral wall 54. The divider cup 60 comprises an inner bore 62, first and second generally arcuate base portions 64a and 64b, first and second upper lobe portions 66a and 66b and side wall portions 68, see FIGS. 5 and 7. The distributor 40 is rotated via a suitable drive mechanism having a shaft 42.

The divider cup 60 defines with the outer casing 50 alternating first and second chambers 70 and 72. In the illustrated embodiment, the divider cup 60 and the outer casing 50 define two substantially diametrically opposed first chambers 70 and two substantially diametrically opposed second chambers 72, see FIGS. 4A, 5, 8A and 8B. The first and second base portions 64a and 64b define with the outer casing 50 and the side wall portions 68 the two first chambers 70. The first and second upper lobe portions 66a and 66b define with the outer casing 50 and the side wall portions 68 the two second chambers 72. The first orifices 56 communicate with the first chambers 70 while the second orifices 58 communicate with the second chambers 72.

The interior of the distributor 40 is supplied with two separate streams of molten glass, a first stream of glass A and a second stream of glass B. The first stream of glass A is delivered via a first delivery tube 80 while the second stream of glass B is delivered via a second delivery tube 82. The first stream of glass A, after exiting tube 80, is intercepted by an upper surface 69 of the divider cup 60 before reaching the bottom wall 52 of the outer casing 50. It then flows outwardly due to centrifugal force toward the outer casing peripheral wall 54 where it forms a build-up or head of glass A in the first chambers 70, see FIGS. 4A and 8A. The second stream of glass B exits the second delivery tube 82, drops directly onto the bottom wall 52 of the outer casing 50 and flows outwardly due to centrifugal force toward the outer casing peripheral wall 54 to form a head of glass B in the second chambers 72, see FIGS. 2, 4A and 8B.

Figure 8A:
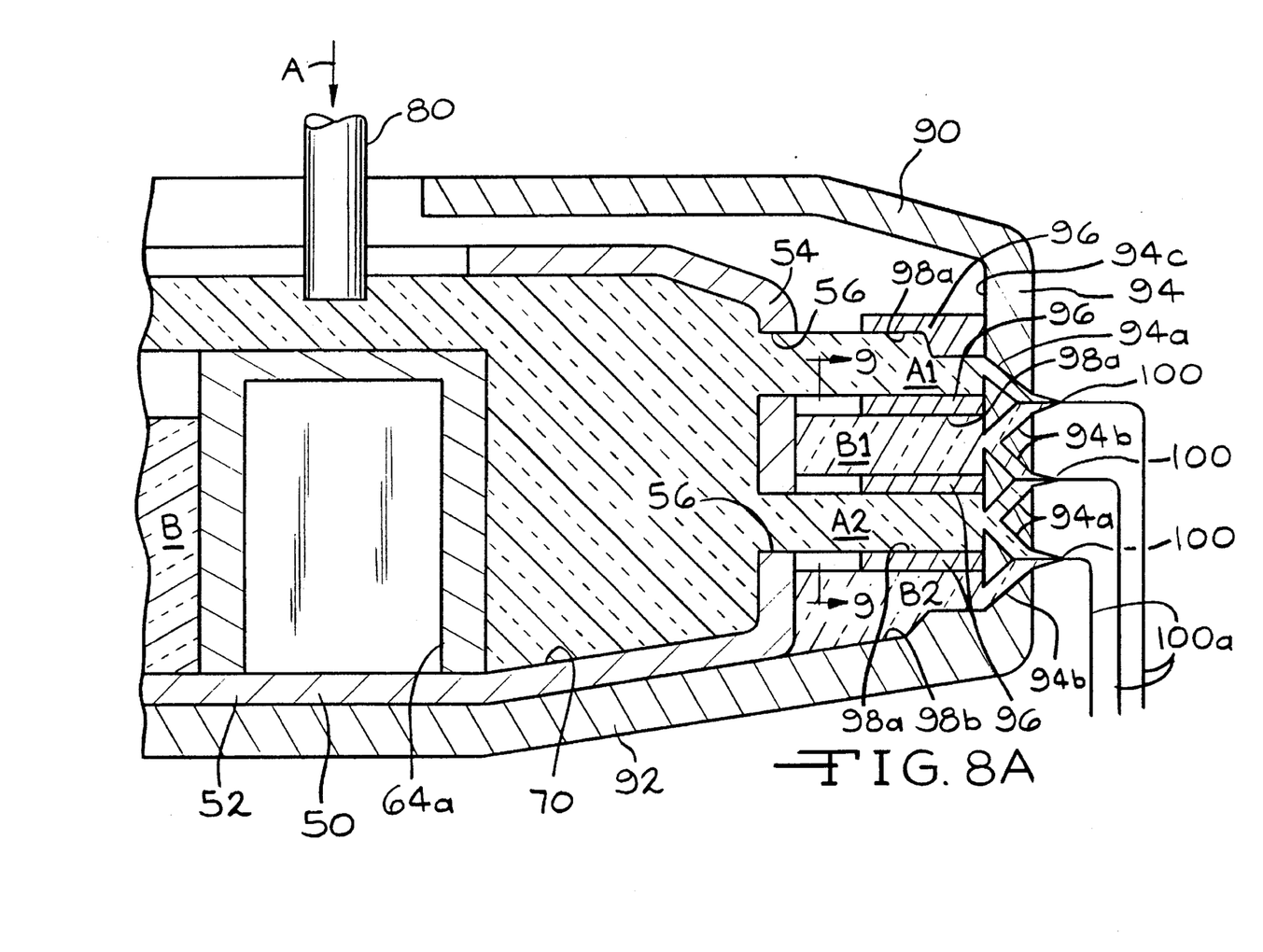
FIG. 8A is an enlarged view, in cross-section, of a portion of the spinner and distributor and illustrates a first chamber as defined by the outer casing and divider cup.

As the distributor 40 is rotated via shaft 42, molten A glass is centrifuged radially outwardly from the first orifices 56 to form thin layers of glass A, see FIG. 8A. Also, molten B glass is centrifuged radially outwardly from the second orifices 58 to form thin layers of B glass, see FIG. 8B.

Typically, orifices 56 and 58 will have a diameter of from between about 0.050 to about 0.100 inch (0.25 to about 1.0 mm). The relative sizes of the orifices may differ to produce different flow rates of A and B glasses. This in turn will affect the percentages of A and B glasses in the dual component fibers. Additionally, the sizes of the orifices may affect the build-up or head of glasses in the chambers 70 and 72. Again, depending upon the relative viscosities of the A and B glasses, this may affect the relative ratios of A and B glasses in the dual component fibers.

While two first chambers 70 and two second chambers 72 have been illustrated, it will be appreciated that one or three or more of each of the first and second chambers 70 and 72 may be defined by the divider cup 60 and the outer casing 50.

As shown, orifices 56 and 58 are circular in cross-section. However, other shapes may be utilized including elongated slots. However, one of the advantages of the present invention is that simple circular holes may be drilled and used. The orifices may be drilled into the outer casing wall by any one of several known drilling techniques such as mechanical drilling, laser drilling, electrical discharge milling (EDM), or electron beam drilling.

Referring back to FIG. 2, the distributor 40 is nested within a rotatable spinner 90. In the illustrated embodiment, the distributor 40 is fixedly attached to the spinner 90 by welding or conventional fasteners. Hence, the spinner 90 rotates with the distributor 40. However, it is also contemplated that the spinner 90 may rotate independently of the distributor 40 in which case a further shaft or other rotation mechanism would be provided for the spinner 90.

Figure 8B:
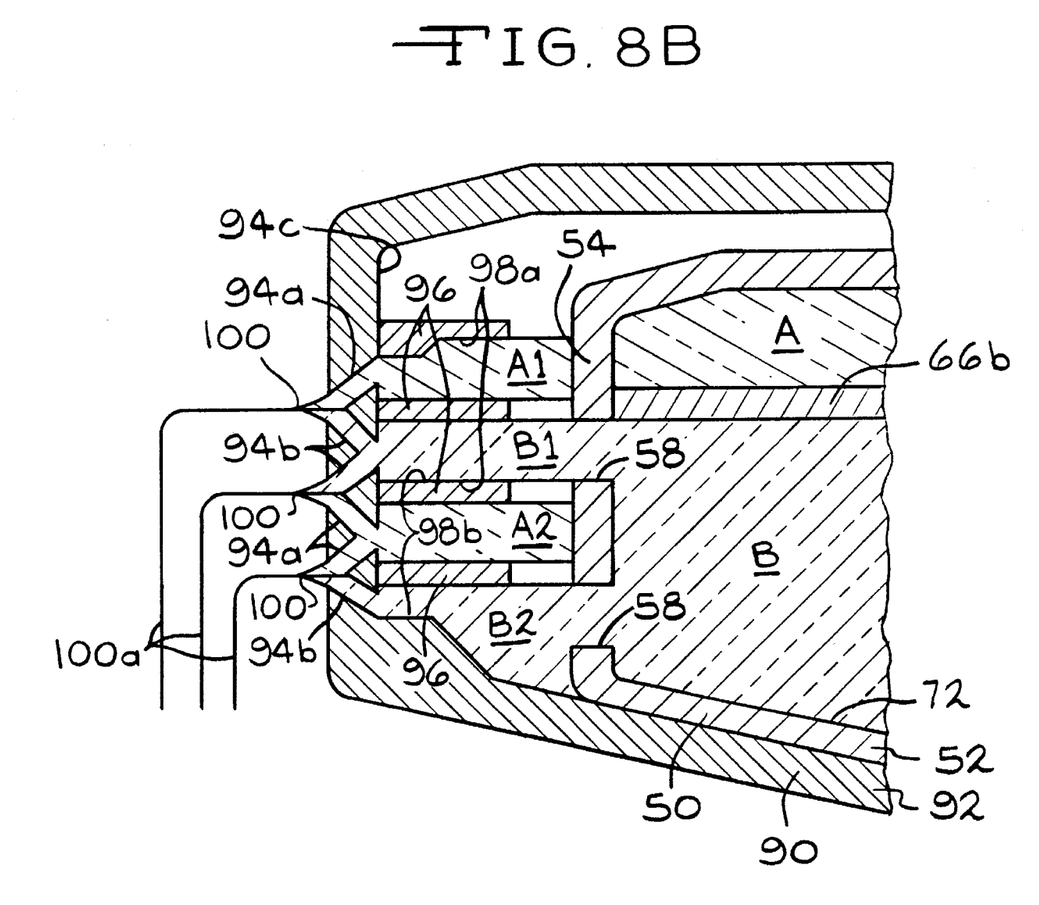
FIG. 8B is an enlarged view, in cross-section, of a portion of the spinner and distributor and illustrates a second chamber as defined by the outer casing and divider cup.
Figure 9:
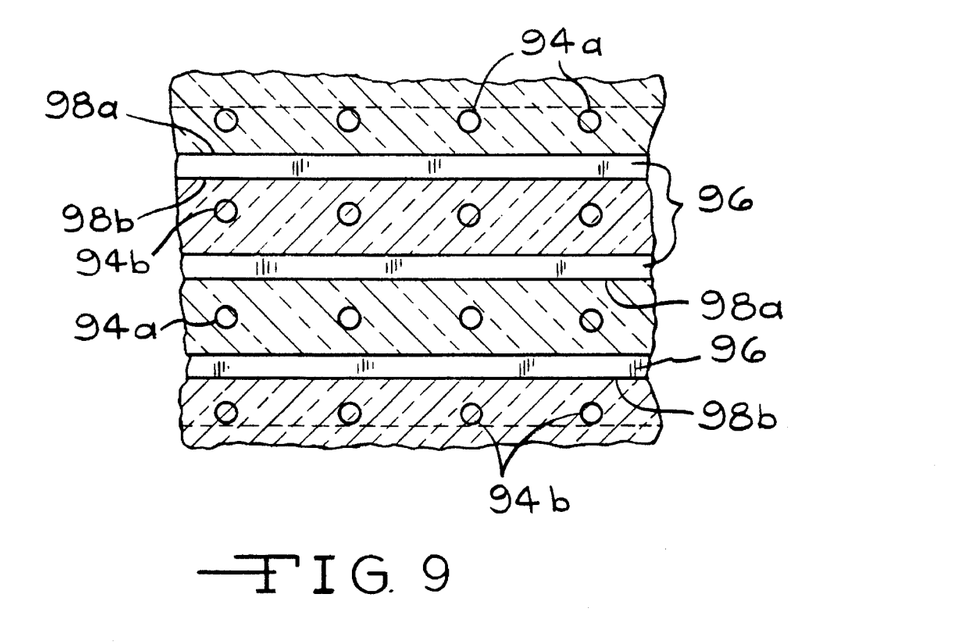
FIG. 9 is a view taken along line 9—9 in FIG. A.

The spinner 90 has a bottom wall 92 and a peripheral wall 94 and includes first and second passages 94a and 94b extending through the peripheral wall 94, see FIGS. 8A, 8B and 9. The spinner 90 also includes a plurality of baffles 96 which extend circumferentially about the inner face 94c of the spinner peripheral wall 94. The baffles 96 define with the inner face 94c a plurality of generally horizontally aligned first and second alternating compartments 98a and 98b. The first compartments 98a are positioned directly across from the first orifices 56 while the second compartments 98b are positioned directly across from the second orifices 58. The first passages 94a communicate with the first compartments 98a and the second passages 94b communicate with the second compartments 98b. In the illustrated embodiment, adjacent ones of the first and second passages 94a and 94b join together in a V-shape. Alternatively, adjacent ones of the first and second passages 94a and 94b may join together in a Y-shape or other appropriate shape. It is also contemplated that adjacent ones of the first and second passages 94a and 94b may be replaced by a single slot (not shown) having a width that is greater than the width of its corresponding baffle 96.

As best shown in FIGS. 8A and 8B (where relative dimensions have been altered for purposes of illustration), the thin, alternating layers of A glass, A1 and A2, and B glass, B1 and B2, centrifuged from distributor 40 are received in the first and second spinner compartments 98a and 98b. Upon reaching the inner face 94c, the alternating layers are centrifuged through the first and second passages 94a and 94b to form primary fibers 100, see FIGS. 8A and 8B. The primary fibers 100 are maintained in a soft, attenuable condition by the heat of annular burner 110 (see FIG. 2). An internal burner (not shown) may also be used to provide heat to the interior of distributor 40 and spinner 90. Annular blower 112 is positioned to pull primary fibers 100 and further attenuate them into secondary dual-glass fibers 100a, suitable for use in wool insulating materials. The dual-glass irregularly-shaped glass fibers 100a are then collected on a conveyor (as shown in FIG. 1) for formation into a wool pack.

It will be appreciated that while only four alternating glass layers have been illustrated, for simplicity and ease of understanding, that many more alternating layers may be formed, depending upon the overall height of the spinner 90 and distributor 40, and the size of the orifices and passages in each.

The relative sizes of the passages 94a and 94b may differ to produce different flow rates of A and B glasses. This in turn will affect the percentages of A and B glasses in the dual component fibers.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

I claim:

1. An apparatus for making dual component fibers comprising:

a distributor having an outer casing and a divider cup fixedly positioned within said outer casing, said outer casing having a bottom wall and a peripheral wall and including first orifices and second orifices extending through said peripheral wall, said divider cup defining, with said outer casing, at least one first chamber and at least one second chamber, for receiving first and second molten thermoplastic materials, said first orifices communicating with said at least one first chamber and said second orifices communicating with said at least one second chamber;

equipment for supplying first and second molten thermoplastic materials to said distributor;

a rotatable spinner having a peripheral wall and a bottom wall and including first passages and second passages in said spinner peripheral wall; and, a rotation mechanism for rotating said distributor and said spinner to centrifuge said first and second thermoplastic materials through said first and second orifices in said peripheral wall of said outer casing and against an inner face of said peripheral wall of said spinner and to centrifuge dual component fibers through said first and second passages in said peripheral wall of said spinner.

2. An apparatus as claimed in claim 1, wherein said rotatable spinner includes a plurality of baffles which define, with the inner face of said peripheral wall of said spinner, a plurality of generally horizontal compartments, said first passages communicate with alternate ones of said compartments and said second passages communicate with remaining ones of said compartments.

3. An apparatus as claimed in claim 2, wherein adjacent ones of said first and second passages join together in a V-shape.

4. An apparatus as claimed in claim 2, wherein adjacent ones of said first and second passages join together in a Y-shape.

5. An apparatus as claimed in claim 1, wherein said distributor includes a plurality of said at least one first chamber and a plurality of second chambers.

6. An apparatus as claimed in claim 1, wherein said at least one first chamber comprises two first chambers which are substantially diametrically opposed to one another and said at least one second chamber comprises two second chambers which are substantially diametrically opposed to one another.

7. An apparatus as claimed in claim 6, wherein said divider cup comprises an inner bore, first and second generally arcuate base portions, first and second lobe portions and side wall portions, said first and second base portions defining with said outer casing and said side wall portions said two first chambers and said first and second lobe portions define with said outer casing and said side wall portions said two second chambers.

8. An apparatus as claimed in claim 7, wherein said supplying equipment comprises first and second glass supply tubes, said first glass supply tube extending into said bore and said second supply tube being positioned above an upper surface of said divider cup.

9. An apparatus as claimed in claim 1, wherein said distributor is fixedly located within said rotatable spinner to rotate with said spinner.

10. An apparatus for making dual component fibers comprising:

a distributor having an outer casing and a divider portion, said outer casing having a bottom wall and a peripheral wall and including first orifices and second orifices extending through said peripheral wall, said divider portion defining, with said outer casing, at least one first chamber and at least one second chamber, for receiving first and second molten thermoplastic materials, said first orifices communicating with said at least one first chamber and said second orifices communicating with said at least one second chamber;

equipment for supplying first and second molten thermoplastic materials to said distributor;

a rotatable spinner having a peripheral wall and a bottom wall and including first passages and second passages in said peripheral wall, said rotatable spinner further including a plurality of baffles which define, with an inner face of said peripheral wall of said spinner, a plurality of generally horizontal compartments, said first passages communicate with alternate ones of said compartments and said second passages communicate with remaining ones of said compartments; and, a rotation mechanism for rotating said distributor and said spinner to centrifuge said first and second thermoplastic materials through said first and second orifices in said peripheral wall of said outer casing and against an inner face of said peripheral wall of said spinner and to centrifuge dual component fibers through said first and second passages in said peripheral wall of said spinner.

11. An apparatus as claimed in claim 10, wherein adjacent ones of said first and second passages join together in a V-shape.

12. An apparatus as claimed in claim 10, wherein adjacent ones of said first and second passages join together in a Y-shape.

13. An apparatus as claimed in claim 10, wherein said distributor includes a plurality of said at least one first chamber and a plurality of said at least one second chamber.

14. An apparatus as claimed in claim 10, said at least one first chamber comprises two first chambers which are substantially diametrically opposed to one another and said at least one second chamber comprises two second chambers which are substantially diametrically opposed to one another.

15. Am apparatus as claimed in claim 14, wherein said divider portion comprises an inner bore, first and second generally arcuate base portions, first and second lobe portions and side wall portions, said first and second base portions defining with said outer casing and said side wall portions said two first chambers and said first and second lobe portions defining with said outer casing and said side wall portions said two second chambers.

16. An apparatus as claimed in claim 15, wherein said supplying equipment comprises first and second glass supply tubes, said first glass supply tube extending into said bore and said second supply tube being positioned above an upper surface of said divider portion.

17. An apparatus as claimed in claim 10, wherein said distributor is fixedly located within said rotatable spinner to rotate with said spinner.

* * * * *